ABSTRACT
United States Patent [19]
de Jong et al.

[11] Patent Number: 4,486,812
[45] Date of Patent: Dec. 4, 1984

[54] CAPACITIVE PRESSURE TRANSDUCER
[75] Inventors: J. N. M. de Jong, Westford; R. L. Earle, Mendon, both of Mass.
[73] Assignee: Sperry Corporation, New York, N.Y.
[21] Appl. No.: 470,750
[22] Filed: Feb. 28, 1983
[51] Int. Cl.³ .................... H01G 7/00; G01L 19/04
[52] U.S. Cl. ...................................... 361/283; 73/718
[58] Field of Search ................. 73/718, 724; 361/283
[56] References Cited
U.S. PATENT DOCUMENTS
3,697,835 10/1972 Satori ........................... 73/718 X
4,064,550 12/1977 Dias et al. ......................... 361/283
4,232,698 11/1980 Hosterman et al. ........... 361/283 X
4,357,834 11/1982 Kimura ........................... 73/718 X

*Primary Examiner*—Donald A. Griffin
*Attorney, Agent, or Firm*—Howard P. Terry

[57] ABSTRACT

A rigid capacitor plate for use in a capacitive pressure transducer of the type having a flexible diaphragm with a concave central portion serving as a pressure responsive capacitor plate, said rigid plate being supported on and spaced from said diaphragm by a plurality of small cross-sectional area pedestals.

5 Claims, 2 Drawing Figures

CAPACITIVE PRESSURE TRANSDUCER

BACKGROUND OF THE INVENTION

1. Field of the Invention

The present invetnion relates to pressure transducers for converting pneumatic or hydraulic pressure changes to electrical signals and more specifically to improved capacitive pressure transducers of the type employing a flexible diaphragm.

2. Description of the Prior Art

Co-pending patent application Ser. No. 330,527 filed in the names of the present inventors concerns a capacitive pressure transducer that includes a housing, diaphragm having a flexible concave surface formed therein, and a rigid plate disposed substantially parallel to the diaphragm such that an air gap is formed between the rigid plate and the diaphragm. In one embodiment of the invention of application Ser. No. 330,527, the rigid plate is formed from a metallic disk containing an annular groove. A layer of mica is interposed between the grooved face of the disk and the diaphragm. When pressure is applied or removed from the diaphragm the concave portion of the diaphragm deflects so as to effectively alter the air gap between the plate and the diaphragm thus changing the capacitance of the unit as a function of the magnitude of the pressure change.

The present invention provides an improvement over the above-described transducer and exhibits increased sensitivity and linearity as well as decreased transient temperature sensitivity.

SUMMARY OF THE INVENTION

Capacitive pressure transducers inherently exhibit a fixed stray capacitance in parallel with the pressure responsive variable capacitance used to sense pressure changes. This stray capacitance is minimized in the transducer of the present invention by spacing the rigid capacitor plate from the flexible plate by means of a series of small cross-section pedestals.

DESCRIPTION OF THE PREFERRED EMBODIMENT

Figure 1:
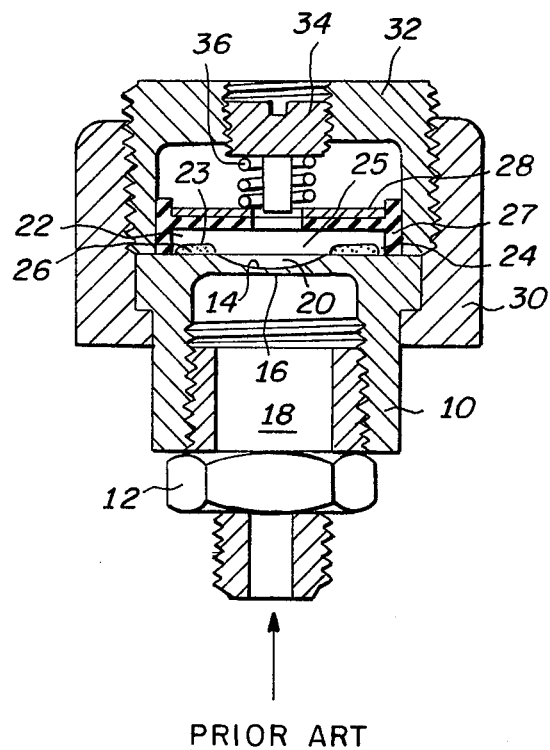
FIG. 1 is a cross section view of a prior art capacitive pressure transducer, and FIG. 2 includes a plan and an elevation drawing of a rigid capacitor plate constructed in accordance with the principles of the present invention.

FIG. 1 is a cross sectional view of a prior art capacitive pressure transducer described and claimed in the aforementioned patent application Ser. No. 330,527.

In FIG. 1, a flexible plate member 10 is threaded onto an adapter 12 so as to coupled the transducer to the source of pressure to be measured. In accordance with the teachings of Ser. No. 330,527, the flexible plate member 10 includes a concave "dimple" 14 that forms a relatively flexible diaphragm 16 which distorts axially in response to pressure changes within the chamber 18. The "dimple" provides an air gap 20 between the diaphragm 16 and the central portion of a rigid capacitor plate 22 constructed from a metallic disk in which an annular groove 23 is formed. The annular groove 23 effectively provides a circumferential support ring 24 and a protuberant central "mesa" 25 that forms the actual capacitor portion of the rigid plate 22. A thin dielectric 26 such as a 0.5 mil thick mica wafer separates the plate 22 and the flexible plate, thus forming a capacitor whose capacitance varies with the applied pressure. The rigid plate 22 is surrounded by an insulating member 27 and is secured in position by a washer 28. Typically, a nut 30 may be used to secure a threaded cover 32 over the capacitor plates and a screw 34 threaded into a bore in the cover 32 may be used to adjust a spring member 36 such that the spring tension can exert a substantially constant force on the plate 22 and the mica wafer 26.

The aforementioned prior art transducer has proven valuable in its intended environments such as mobile hydraulic systems which require considerable accuracy. However the prior art embodiment depicted in FIG. 1 of the present application necessarily exhibits a certain amount of fixed capacity in parallel with the pressure-sensitive variable capacity because of the proximity of rigid plate 22 and the adjacent immovable portions of the plate containing the concave "dimple". Although the grooved portion of the fixed plate 22 serves to lessen this fixed capacity, it is desirable in many instances to further reduce this parameter so as to improve the operating characteristics of the transducer. The present invention accomplishes this improvement by replacing the rigid capacitor plate 22 by a plate of the type illustrated in FIG. 2.

Figure 2:
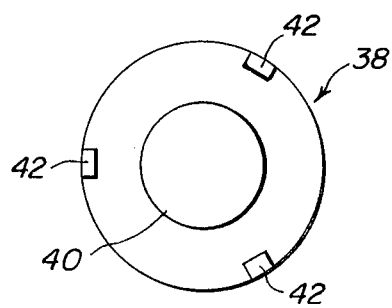
Figure 2:

The rigid capacitor plate of the present invention depicted in FIG. 2 consists of a metallic disk 38 having an outside diameter appropriate for insertion in an insulating member such as member 27 of FIG. 1. The disk 38 contains a central mesa portion 40 forming the actual capacitor plate analogous to the mesa portion 25 of the rigid plate 22 depicted in FIG. 1. However, rather than being supported by a circumferential support ring 24, the rigid capacitor plate of the present invention is supported on a plurality of pedestals 42. Typically, the rigid capacitor plate 38 contains three equally spaced pedestals around the periphery of the plate as depicted in FIG. 2 although more pedestals may be used if desired. Alternatively, as few as two pedestals may be used if desired.

Each pedestal has a height equal to the height of the mesa portion 40 so that the entire plate 38 will rest firmly on the dielectric wafer used to separate the two capacitor plates in the assembled transducer.

The improved rigid capacitor plate of the present invention may be readily fabricated, if desired, by merely machining away all of the circumferential support ring except the pedestal areas of an existing rigid plate constructed in accordance with the teachings of Ser. No. 330,527.

In some instances, it may be advantageous to fabricate the pedestals from a non-conducting material.

Tests have shown that the improved rigid capacitor plate of the present invention provides a significant increase in sensitivity when used in a transducer of the type depicted in FIG. 1 since the improved rigid plate reduces the fixed stray capacity effectively shunting the pressure-responsive variable capacity of the "dimple" area of the assembled transducer. In addition, the reduction in stray capacity provides a significant improvement in the linearity of a transducer in which it is used.

Tests have also shown that the improved rigid capacitor plate provides a decrease in transient temperature sensitivity apparently resulting from increased air circulation in the region between the capacitor plates.

While the invention has been described in its preferred embodiments, it is to be understood that the words which have been used are words of description rather than words of limitation and that changes may be made within the purview of the appended claims without departing from the true scope and spirit of the invention in its broader aspects.

We claim:

1. A rigid plate capacitor element for use in a variable capacitance pressure transducer of the type having a diaphragm with a pressure responsive flexible center portion serving as a second capacitor plate, said improved rigid plate element comprising:

a disk-like base member having a protuberant center portion on one face dimensioned to cooperate with said flexible center portion of said diaphragm to form a variable capacitor said protuberant center portion being a flat-topped mesa-like structure having a face at a height above and parallel to said one face of said rigid plate; and a plurality of pedestals having heights equal to said height of said flat-top of said mesa-like structure for supporting said rigid plate in a plane parallel to and at a specified distance from said diaphragm.

2. The rigid plate capacitor element of claim 1 further characterized in that said pedestals are dispersed around the periphery of said disk-like base member.

3. The rigid plate capacitor element of claim 1 further characterized in that said capacitor element includes three equally-spaced pedestals.

4. The rigid plate capacitor element of claim 2 further characterized in that said capacitor element is fabricated from a single metallic block.

5. The rigid plate capacitor element of claim 2 wherein said disk-like base member and said protuberant center portion are fabricated from metal and said pedestals are fabricated from a non-conducting material.

* * * * *